United States Patent
Shaffer

(10) Patent No.: US 6,575,192 B1
(45) Date of Patent: Jun. 10, 2003

(54) CHECK VALVE FOR A PRECHAMBER ASSEMBLY

(75) Inventor: Bradley J. Shaffer, Romney, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/706,480

(22) Filed: Nov. 3, 2000

(51) Int. Cl.[7] .......................... F16K 21/10; F16K 15/08
(52) U.S. Cl. ........................... 137/514.5; 137/516.13; 137/516.15
(58) Field of Search ..................... 137/516.15, 516.13, 137/512.1, 516.17, 514, 514.5; 123/297

(56) References Cited

U.S. PATENT DOCUMENTS

| | | | | |
|---|---|---|---|---|
| 1,359,006 A | * | 11/1920 | Wardwell | 137/516.15 |
| 1,846,753 A | * | 2/1932 | Rayfield | 137/516.15 X |
| 3,037,523 A | * | 6/1962 | Szaniszlo | 137/514 |
| 3,119,410 A | * | 1/1964 | Noecker | 137/516.15 X |
| 3,320,097 A | * | 5/1967 | Sugalski | 137/512.15 |
| 3,363,644 A | * | 1/1968 | Malec | 137/516.15 |
| 3,415,272 A | | 12/1968 | Blackhawk et al. | |
| 3,536,094 A | * | 10/1970 | Manley, Jr. | 137/512.1 |
| 3,656,500 A | * | 4/1972 | Mayer, Sr. et al. | 137/516.17 X |
| 3,777,779 A | * | 12/1973 | Schwaller | 137/512.3 |
| 3,812,880 A | * | 5/1974 | Bauer | 137/516.15 |
| 3,830,253 A | * | 8/1974 | Speich et al. | 137/860 |
| 3,845,782 A | * | 11/1974 | Nicholls et al. | 137/493 |
| 3,885,893 A | | 5/1975 | Glock et al. | |
| 4,060,098 A | * | 11/1977 | Bares et al. | 137/594 |
| 4,100,934 A | * | 7/1978 | Butterworth et al. | 137/512 |
| 4,398,559 A | * | 8/1983 | Bunn et al. | 137/516.15 |
| 4,483,363 A | * | 11/1984 | Madoche et al. | 137/329.04 |
| 4,526,195 A | * | 7/1985 | Humphrey et al. | 137/512.1 |
| 4,627,464 A | * | 12/1986 | Hartshorn | 137/516.13 |
| 4,628,958 A | * | 12/1986 | Miller | 137/512.15 |
| 4,924,906 A | * | 5/1990 | Hrabal | 137/512.1 |
| 4,945,946 A | * | 8/1990 | Gangloff | 137/516.13 |
| 5,024,193 A | | 6/1991 | Graze | |
| 5,052,434 A | * | 10/1991 | Bauer | 137/516.13 |
| 5,311,902 A | * | 5/1994 | Overfield | 137/512.1 |
| 6,019,081 A | | 2/2000 | Divecha et al. | |

* cited by examiner

Primary Examiner—John Rivell
(74) Attorney, Agent, or Firm—Jim Golden; M. B. McNeill; S. D. Lundquist

(57) ABSTRACT

The invention relates generally to a check valve and more particularly to a check valve for a fuel passage of a prechamber assembly of an internal combustion engine comprising a carrier member, a stop member, and a ring member. The ring member is resiliently disposed between the carrier and stop members. The ring member is movable between a first position blocking fluid communication between the carrier and stop members and a second position passing fluid between the carrier and stop members. The principal use is for applications that control fluid passing between components, such as prechamber assemblies in gaseous engines.

19 Claims, 3 Drawing Sheets

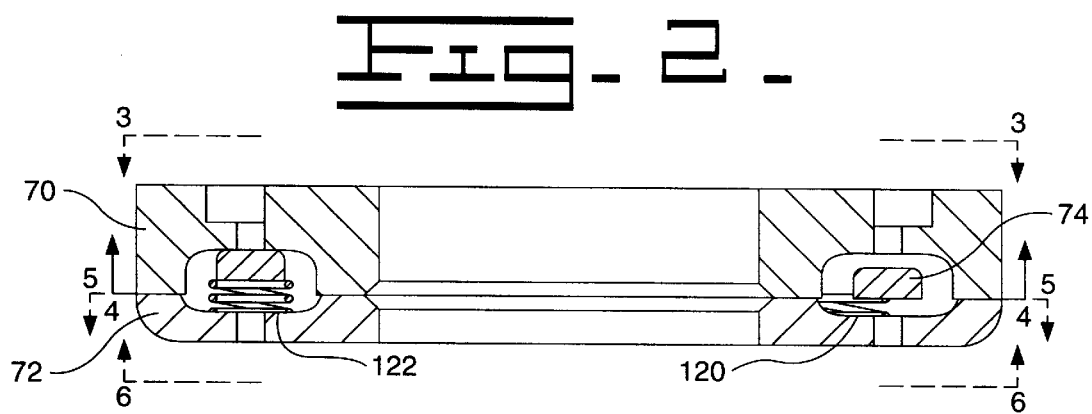
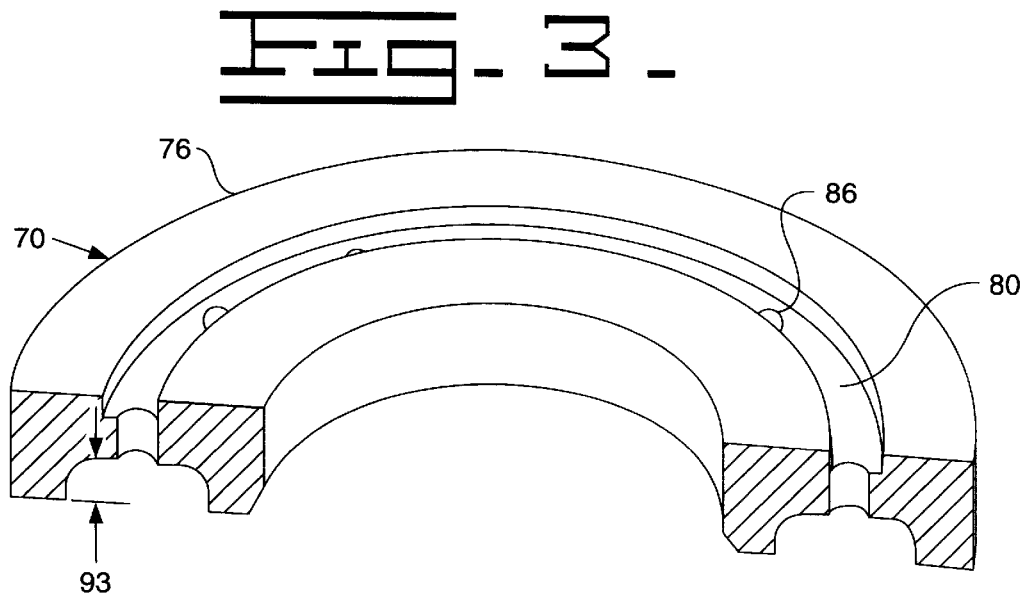
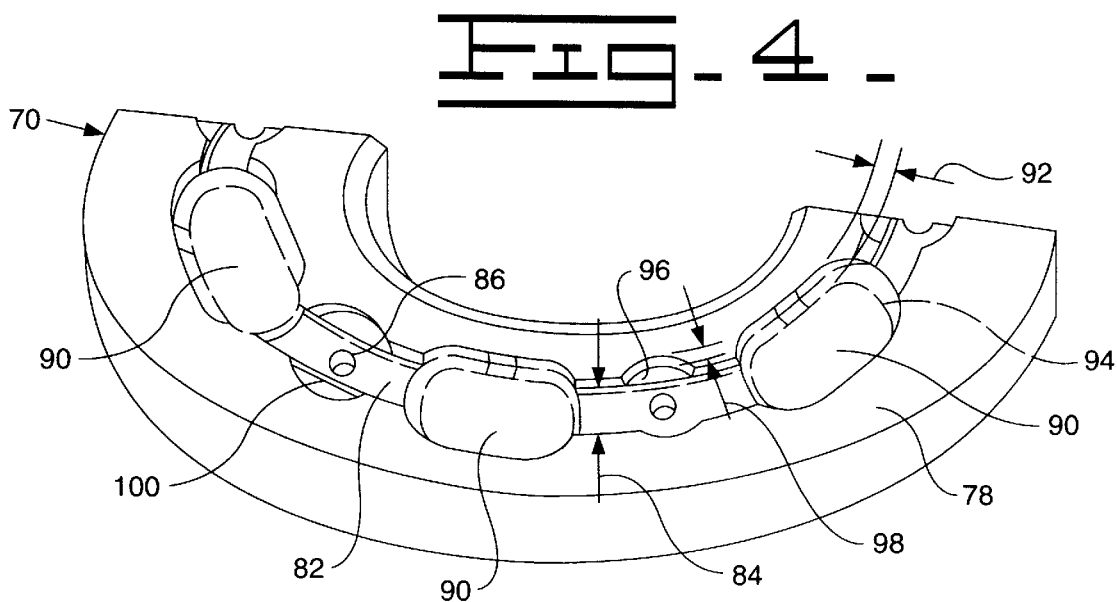

US 6,575,192 B1

CHECK VALVE FOR A PRECHAMBER ASSEMBLY

TECHNICAL FIELD

This invention relates generally to a check valve and more particularly to a check valve for a fuel passage of a prechamber assembly of an internal combustion engine.

BACKGROUND ART

Prechamber systems are well known in the art to provide engines with a stratified combustion in order to reduce undesirable exhaust emissions in an internal combustion engine. Typical systems use a nozzle, spark plug, and check valve. The check valve must open and closed with the engine's combustion cycle to prevent contamination of the fuel with exhaust and/or leakage of fuel into the exhaust gases.

Typical check valves for prechamber systems are the ball check valve and shuttle type check valve. Ball and shuttle type check valves consist of several bores having manufacturing limitations, for example wall thickness, machining, and sealing. These limitations constrain engineers from designing ball or shuttle checks into engines that have space limitations.

The prechamber system must be designed to fit into the cylinder head. Typical cylinder head designs are designed having four valves at a maximum permissible diameter to provide increased air flow and thus improve engine breathing. Additionally, engineers are designing larger cooling passages in the cylinder head to dissipated the heat transmitted from combustion. Cylinder head designs are providing less space for fuel system components, such as the prechamber. Furthermore, servicing of the prechamber is desired and typical prechambers require that the valve be removed for servicing. Engineers typically design the prechamber to fit between the engine valves so that servicing may be accomplished without removing the engine valves which is difficult to accomplish using state of the art check valves that are well known in the art.

The present invention is directed to overcoming one or more of the problems as set forth above.

DISCLOSURE OF THE INVENTION

In one aspect of the present invention, a check valve includes a carrier member, a stop member, and a ring member. The carrier member has first and second opposed sides, an annular ring groove disposed in the carrier member and opening at the second side, and a plurality of first orifices disposed in the carrier member and opening into the annular ring groove. The stop member has first and second opposed sides and a plurality of first orifices disposed in the stop member and opening at the first side, and the first side at least partially engages the second side of the carrier member. The ring member is movably disposed in the annular ring groove of the carrier member and movable between a first position at which the ring member is adapted to block fluid communication between the plurality of first orifices in the carrier and stop members and a second position at which the ring member passes fluid between the plurality of first orifices in the carrier and stop members.

In another aspect of the present invention, a combustion prechamber assembly for an internal combustion engine includes an upper housing, a lower housing, a check valve, and a prechamber member. The upper housing has an inlet in fluid communication with a supply of gaseous fuel and an outlet port in fluid communication with an annular supply groove. The lower housing has an inlet port in fluid communication with a plurality of first orifices and an outlet port in fluid communication with a fuel receiving chamber. The check valve has a carrier member, a stop member, and a ring member disposed between the carrier and stop members. The check valve is disposed between the upper and lower housings. The ring member has a first position adapted to block fluid communication between the outlet port of the upper housing and the inlet port of the lower housing and a second position adapted to pass fluid between the outlet port of the upper housing and the inlet port of said lower housing. The prechamber member has the fuel receiving chamber disposed therein. The fuel receiving chamber has an inlet port in communication with the outlet port of the lower housing and at least one orifice.

In yet another aspect of the present invention, a method of servicing an ignition assembly includes an upper housing, a lower housing having a first portion having a first surface and a second portion, a spark plug, and a check valve having a carrier member, a stop member fixedly attached to the carrier member, and a ring member resiliently disposed in the carrier member. The method comprises the steps of threadably disengage the spark plug from the second portion of the lower housing. Threadably disengage the upper housing from the first portion of the lower housing. Relatively longitudinally lift the check valve from the first surface of the first portion. Relatively longitudinally deposit another check valve and the stop member engages the first surface of the first portion. Threadably engage the upper housing with the first portion of the lower housing. Threadably engage the spark plug with the second portion of the lower housing.

BRIEF DESCRIPTION OF THE DRAWINGS

FIG. 2 is an exploded diagrammatic cross-sectional view of the check valve of the prechamber assembly of FIG. 1 embodying the present invention;

FIG. 3 is a diagrammatic top plan view of a carrier member of the check valve of FIG. 2 embodying the present invention;

FIG. 4 is a diagrammatic bottom plan view of a carrier member of the check valve of FIG. 2 embodying the present invention;

BEST MODE FOR CARRYING OUT THE INVENTION

Figure 1:
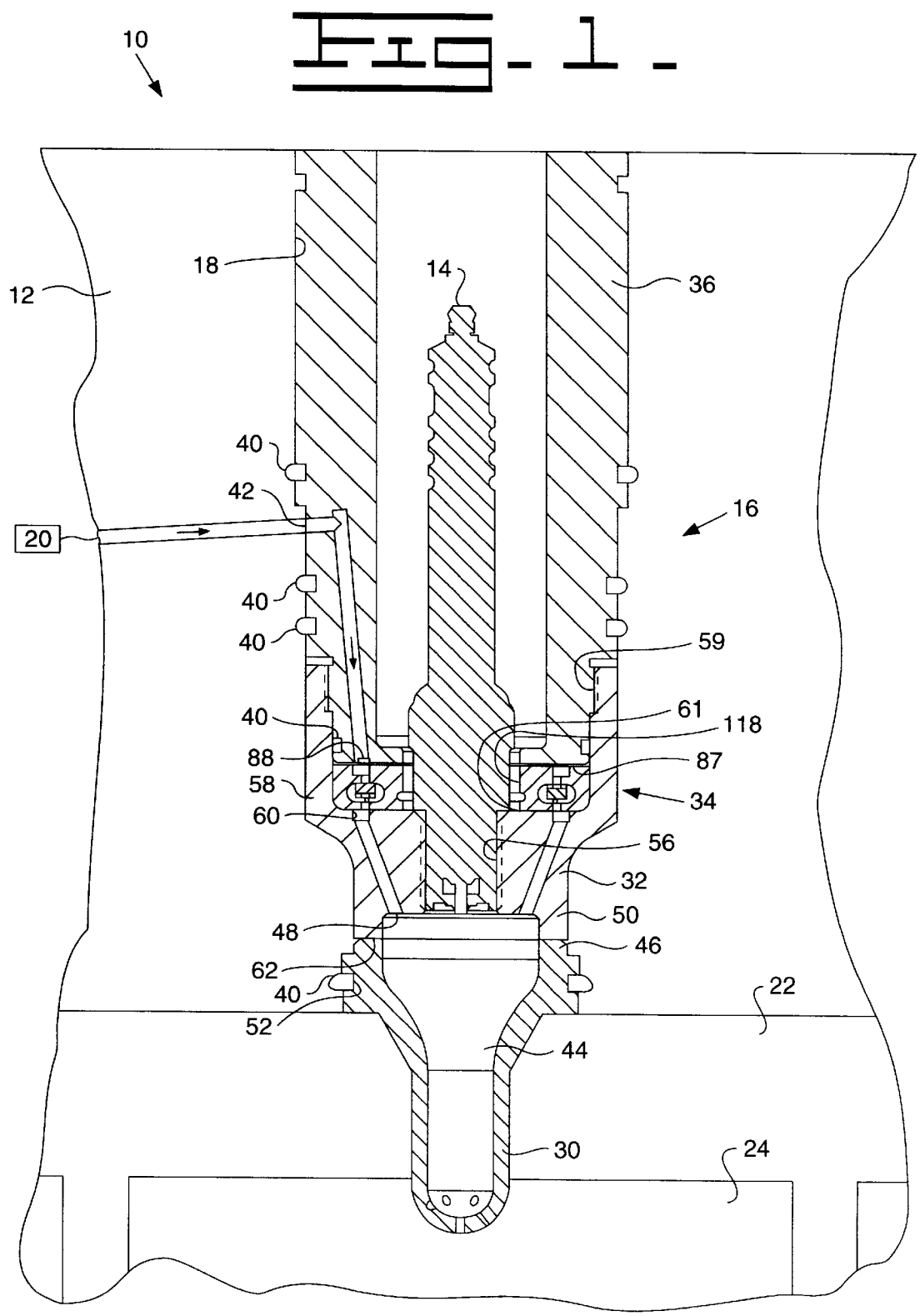
FIG. 1 is a diagrammatic partial cross-sectional view of a prechamber assembly embodying the present invention.

Referring to FIG. 1 a partial view of an internal combustion engine 10 is shown with one embodiment of the present invention. The internal combustion engine 10 has a cylinder head 12. The cylinder head 12 typically has bores machined for engine valves (not shown), i.e. inlet and exhaust valves, injection devices, and engine cooling passages. Injection devices may be a fuel injector (not shown), glow plug (not shown), spark plug 14, a prechamber assembly 16, or a combination thereof. FIG. 1 shows an ignition bore 18 disposed through the cylinder head 12. The engine 10 has a supply 20, such as gaseous fuel (natural gas). The internal combustion engine 10 further defines a cylinder block 22 which has a combustion chamber 24 for combustion of the air/fuel mixture.

The prechamber assembly 16 has a prechamber member 30, a lower housing 32, a check valve 34, an upper housing 36, and the spark plug 14. The prechamber assembly 16 is preferably used in gas engines 10 and is disposed in the ignition bore 18 of the cylinder head 12. Insertion of the prechamber assembly 16 into the ignition bore 18 includes sealing devices 40 between the prechamber assembly 16 and the cylinder head 12. For example, seals are used to isolate an inlet port 42 of the upper housing 36 from communicating with other passages within the cylinder head 12, such as cooling and air passages. Typical sealing devices 40 that may be used are o-rings, press fit, metal seals, and the like.

The prechamber member 30 extends through the cylinder head 12 and into the combustion chamber 24. A fuel receiving chamber 44 is disposed within the prechamber member 30. The fuel receiving chamber 44 has an upper portion 46 which is adjacent to the spark plug 14 and is in fluid communication with an outlet port 48 of the lower housing 32. The prechamber member 30 engagingly abuts a second portion 50 of the lower housing 32 after being assembled. The abutment of the prechamber member 30 and the second portion 50 may be sealed by sealing devices that are well known in the art, such as, o-rings, press fit, metal seals, gaskets, welding, and the like. The prechamber member 30 has a groove 52 disposed about the periphery and is used for sealing. Typically, an o-ring seal is positioned in the groove 52 of the prechamber member 30 to provide a seal between the prechamber member 30 and the cylinder head 12. Additional sealing techniques may be used to seal between the prechamber member 30 and the cylinder head 12. For example, a gasket, a taper fit, and/or a press fit may be used for sealing combustion gases and engine coolant present in the cylinder head 12.

The prechamber assembly 16 includes the lower housing 32 which passes fluid from the gaseous supply 20 to the fuel receiving chamber 44 of the prechamber member 30. The lower housing 32 also includes a first spark plug receiving bore portion 56. The first spark plug receiving bore portion 56 is generally threaded and thus provides a threadable engagement for the spark plug 14. The lower housing 32 has a first portion 58 and the second portion 50. The first portion 58 includes an upper housing receiving bore 59. The upper housing receiving bore 59 is generally threaded and thus provides a threadable engagement between the upper housing 36 and the lower housing 32. However, other types of engagement maybe used, such as, welding, press fitting, and the like. In addition, the upper housing 36 may have the sealing device 40 disposed about it's periphery to provide a seal between the upper housing 36 and the lower housing 32. The first portion 58 further defines the inlet port 60 which allows fluid to pass into the lower housing 32 from the check valve 34. In the preferred, the inlet port 60 is generally an annular groove. It should be recognized that different geometric configurations for the inlet port 60 may be used, such as, semi-circular, rectangular, triangular, and the like. A first surface 61 is located on the first portion 58 of the lower housing 32 and engages the check valve 34 after being assembled. The engagement of the first surface 61 and the check valve 34 may be sealed using sealing devices that are well known in the art, for example, adhesive, metal sealing gaskets, o-rings, brazing, and the like. A second surface 62 of the second portion 50 of the lower housing 32 has the outlet port 48 that is in fluid communication with the inlet port 60 of the lower housing 32. As mentioned above the prechamber member 30 engages the second surface 62 of the lower housing 32 and may be sealed or welded together.

Referring to FIGS. 1 and 2, the check valve 34 is disposed in the lower housing 32 and engages the first surface 61. The check valve 34 has a second spark plug receiving bore portion 118, a carrier member 70, a stop member 72, and a ring member 74. The ring member is disposed between the stop and carrier members 72, 70. The check valve 34 may have the carrier member 70 fixedly engaged with the stop member 72 to provide a seal between the carrier member 70 and the stop member 72. Typical techniques used to fixedly engage the carrier and stop members 70, 72 are welding, adhesive, metal gaskets, and the like.

The carrier member 70, as shown in FIGS. 3 and 4, of the check valve 34 has first and second opposed sides. The first side 76 generally defines an annular supply groove 80 for passing gaseous fuel 20 from the upper housing 36 to the check valve 34. However, it should be recognized that different geometric configurations of the supply groove 80, such as, semi-circular, rectangular, triangular, and the like may be used without departing from the spirit of the invention. Other embodiments may provide the carrier member without the annular supply groove 80 and thus have a generally flat first side 76. The upper housing 36 has a bottom surface 87 that engages the first side 76 of the carrier member 70. The engagement of the bottom surface 87 and the first side 76 of the carrier member 70 may be sealed by sealing devices, such as, adhesive, metal sealing gaskets, o-rings, brazing, and the like. A supply groove 88 is disposed in the upper housing 36. However, it should be recognized that different geometric configurations of the supply groove 88, such as, semi-circular, rectangular, triangular, and the like may be used. The supply groove 88 permits fluid communication between the inlet port 42 and the first side 76 of the carrier member 70 regardless of angular orientation between the inlet port 42, sealing devices, and the first side 76. Other embodiments may provide the upper housing member 36 without the supply groove 88 and thus have a generally flat bottom surface 87. An annular ring groove 82 is disposed in the carrier member 70 and opens at the second side 78. The annular ring groove 82 has a predetermined width 84 which is generally larger than a predetermined width 85 of the ring member 74. Typically, the width 84 of the ring groove 82 provides a loose fit with the ring member 74 but also guides the ring member 74 during operation. A plurality of first orifices 86 are disposed in the ring groove 82 and open into the annular ring groove 82. The plurality of first orifices 86 communicate gaseous fuel 20 from the first side 76, i.e. the annular supply groove 80, to the annular ring groove 82 of the carrier member 70. It should be recognized that other geometric shapes for the annular ring groove 82 and ring member 74, as mentioned above for the annular supply groove 80, maybe used without departing from the spirit of the invention.

A plurality of first depression portions 90 are disposed in the carrier member 70 and open at the second side 78 of the carrier member 70. The plurality of first depression portions 90 extend a predetermined distance 92 from the second side 78 of the carrier member 70 towards the first side 76 of the carrier member 70. The annular ring groove 82 is disposed in the carrier member 70 and extends a predetermined distance 93 from the second side 78 of the carrier member 70 towards the first side 76 of the carrier member 70. The predetermined distance 92, i.e. depth of the plurality of first depressions is generally greater in magnitude than the predetermined distance 93 of the annular ring groove 82. The difference in magnitude between the predetermined distance 93 of the annular ring groove 82 and the predetermined distance 92 of the plurality of first depression portions 90 is characteristic of number, size, shape, and area based upon design criteria, i.e. desired acceleration of ring member 74, desired response, time, duration, sealing between components, fluid flow rates, and the like. The plurality of first orifices 86 are generally elongated depressions but other geometric shapes, such as elliptical, square, circular, and the like may be used without departing from the spirit of the invention. A transitional portion 94 is defined between the plurality of first depressions and the annular ring groove 82. The transitional portion 94 is generally a chamfered, i.e. tapered transition between the plurality of first depressions and the annular ring groove 82. However, transitional portions 94 of other geometric shapes maybe used based on design characteristics.

A plurality of second depression portions 96 are disposed in the carrier member 70 and open at the second side 78 of the carrier member 70. The plurality of second depression portions 96 extend a predetermined distance 98 from the second side 78 of the carrier member 70 towards the first side 76 of the carrier member 70. The predetermined distance 98, i.e. depth of the plurality of second depressions is generally less than or equal in magnitude with the predetermined distance 93 of the annular ring groove 82. The difference in magnitude between the predetermined distance 93 of the annular ring groove 82 and the predetermined distance 98 of the plurality of second depression is characteristic of the area of the plurality of second depression portions 96 based upon design criteria, i.e. desired sealing between components, fluid flow rate, and the like. The plurality of second orifices are generally circular depressions but other geometric shapes, such as elliptical, square, elongated, and the like may be used without departing from the spirit of the invention. A transitional portion 100 is defined between the plurality of second depressions and the annular ring groove 82. The transitional portion 100 is generally a chamfer, i.e. tapered or vertical transition between the plurality of second depressions and the annular ring groove 82. However, transitional portions 100 of other geometric shapes maybe used being primarily dependent on manufacturing techniques being used.

Figure 5:
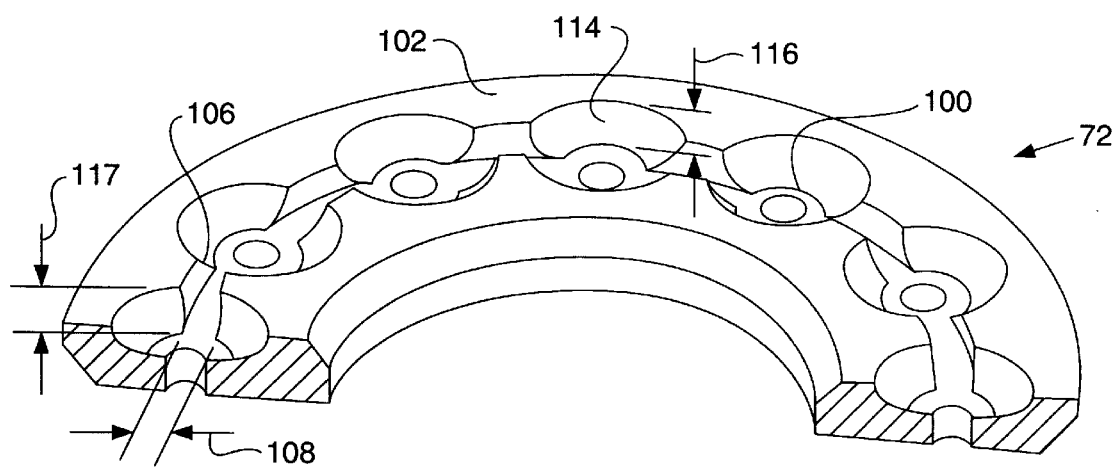
FIG. 5 is a diagrammatic top plan view of a stop member of the check valve of FIG. 2 embodying the present invention.
Figure 6:
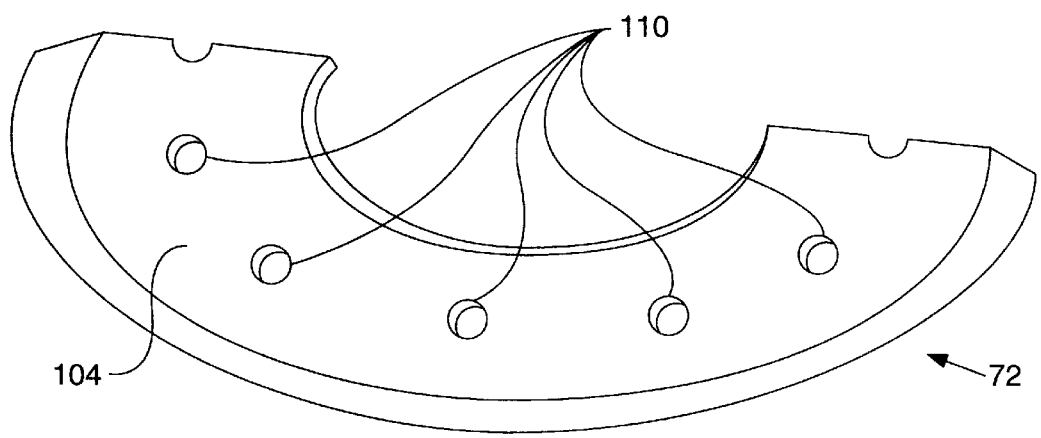
FIG. 6 is a diagrammatic bottom plan view of a stop member of the check valve of FIG. 2 embodying the present invention.

The stop member 72, as shown in FIGS. 5 and 6, of the check valve 34 has first and second opposed sides. The first side 102 generally defines an annular fuel groove 106 for passing fuel 20 that has passed through the carrier member 70 to the lower housing 32 of the prechamber assembly 16. However, it should be recognized that different geometric configurations, such as semi-circular, rectangular, triangular, and the like may be used without departing from the spirit of the invention. The stop member 72 has the first side 102 engaging the second side 78 of the carrier member 70. The first side 102 of the stop member 72 and the second side 78 of the carrier member 70 may be sealed using sealing devices well known in the art, such as, adhesive, metal sealing gaskets, o-rings, brazing, and the like. The fuel groove 106 has a predetermined width 108 which is generally smaller in magnitude than the predetermined width 85 of the ring member 74. A plurality of first orifices 110 are disposed in the stop member 72 and open into the fuel groove 106. The plurality of first orifices 110 of the stop member 72 communicate fuel 20 from a first side 102, i.e. the fuel groove 106, to the inlet port 60 of the lower housing 32. The first side 102 of the stop member 72 at least partially engages the second side 78 of the carrier member 70. A second side 104 of the stop member 72 at least partially engages the first surface 61 of the lower housing 32.

A plurality of first depression portions 114 are disposed in the stop member 72 and open at the first side 102 of the stop member 72. The plurality of first depression portions 114 disposed in the stop member 72 are generally larger in magnitude than the predetermined width 85 of the ring member 74. The plurality of first depression portions 114 extend a predetermined distance 116 from the first side 102 of the stop member 72 towards the second side 104 of the stop member 72. The predetermined distance 116, i.e. depth of the plurality of first depressions is generally equal in magnitude with the fuel groove 106. The predetermined distance 117 of the fuel groove 106 and the predetermined distance 116 of the plurality of first depressions are characteristic of the number, size, shape, and area of the plurality of the first depression portions 114 based upon design criteria, i.e. desired acceleration of the ring member 74, desired response of the ring member 74, sealing between components, flow rate, and the like. The plurality of first depressions are generally frustroconical depressions but other geometric shapes, such as elliptical, square, elongated, and the like maybe used.

Figure 7:
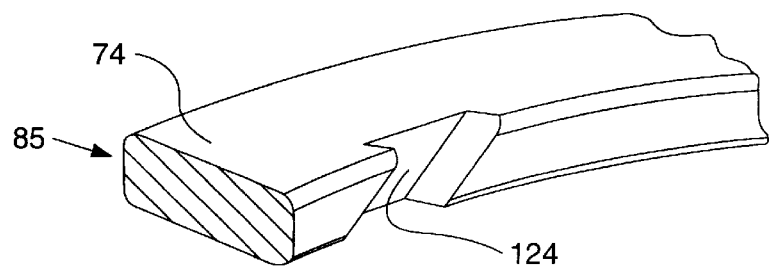
FIG. 7 is a diagrammatic exploded partial cross-sectional view of a portion of the ring member in FIG. 2 embodying the present invention.

The ring member 74, as shown in FIG. 7, of the check valve 34 is disposed in the annular ring groove 82 of the carrier member 70. The ring member 74 may be resiliently biased to engage the annular ring groove 82 without departing from the spirit of the invention. For example, a spring 120 maybe generally disposed about the fuel groove 106 between the stop member 72 and the ring member 74. It should be recognized that a plurality of resilient members 122 maybe disposed in the plurality of first depression portions 114 of the stop member 72 without departing from the spirit of the invention. Other embodiments may use other types of resilient material instead of the spring 120, for example, electromagnetism, permanent magnetism, mechanical actuation system, or different types of resilient material. One skilled in the art would recognize that the ring member 74 may be of different cross sectional geometric shapes such as rectangular, triangular, circular, semi-circular, and the like to provide for movement and guideability of the ring member 74 in the annular ring groove 82. It should be recognized that the ring member 74 may have at least one notch 124 disposed therethrough. The size, shape, and number of notches 124 disposed in the ring member 74 is characteristic of the rotation of the ring member 74 that is desired. One skilled in the art would recognize other geometric configurations to provide the level of rotation desired. For example, a bored hole through the ring member 74 to engagement with a pin or plurality of ridges on sides of the ring member 74.

INDUSTRIAL APPLICABILITY

With reference to the drawings and in operation, manufacturing of smaller prechamber assemblies for use with smaller rated engines 10 and space constraints within the cylinder head 12 are corrected by using the check valve 34. The prechamber assembly 16 is placed into the ignition bore 18 of the cylinder head 12. The prechamber assembly 16 extends into the combustion chamber 24. The prechamber assembly 16 achieves stratified engine operation by having the fuel rich area within the fuel receiving chamber 44 which is in close proximity with the spark plug 14 for improved ignition. The fuel 20 is passed from the supply tank through the upper housing 36, the check valve 34, and the lower housing 32. The fuel rich area is ignited by the spark plug 14 and flame propagation, i.e. ignition kernel, is transferred to the combustion chamber 24 by way of the orifices in the prechamber member 30 and the flame propagation ignites the fuel lean areas.

The check valve 34 operates during the engine cycle when the pressure in the combustion chamber 24 and the fuel receiving chamber 44 is less than the gaseous fuel supply pressure. At this point in the engine cycle the fuel 20 is passed through the carrier member 70 by way of the plurality of first orifices 86 and into the annular ring groove 82 and fresh air is passed into the combustion chamber 24. The fuel 20 that is passed into the annular ring groove 82 fills the plurality of second depression portions 96 and flows around the ring member 74 from the plurality of first and second depression portions 90, 96. The predetermined distance 92 of the plurality of first depression portions 90 is generally larger in magnitude as compared with the predetermined distance 93 of the annular ring groove 82 and the predetermined distance 98 of the plurality of second depression portions 96. The above differences in magnitudes provides communication of fluid about the ring member 74. The gas pressure in the plurality of first depressions assist the ring member 74 into compressing the resilient member and thus pass a larger flow of gaseous fuel 20 into the annular fuel groove 106. The response of the ring member 74 to the pressure differential between the combustion chamber 24 and the fuel supply 20 is dependent on the size and number of the plurality of the second depression portions 96 in the carrier member 70. The fuel 20 that has passed the ring member 74 flows through the plurality of first orifices 110 in the stop member 72, into the inlet port 60 of the lower housing 32, and out the outlet port 48 of the lower housing 32 into the fuel receiving chamber 44. The pressure in the combustion chamber 24 is increased during the compression stroke and reaches a pressure that forces the ring member 74 of the check valve 34 to engage the second side 78 of the carrier member 70, i.e. the annular ring groove 82. Having the ring member 74 engaging the carrier member 70 blocks fluid communication between the plurality of first orifices 86 of the carrier member 70 and the plurality of first orifices 110 in the stop member 72. The fuel rich area in the fuel receiving chamber 44 is ignited by the spark plug 14 and the combustion of fuel 20 propagates into the combustion chamber 24 through orifices in the prechamber member 30. The ignited fuel is passed into the combustion chamber 24 and ignites the fuel lean area. The internal combustion engine exhaust the burned mixture through exhaust valves and the cycle is repeated.

A method of servicing the check valve 34 is discussed below. The spark plug 14 is threadably disengaged from the second portion 50 of the lower housing 32. The upper housing 36 is removed from the cylinder head by threadably disengaging the upper housing 36 from the first portion 58 of the lower housing 32. Once the upper housing 36 is removed, the check valve 34 is relatively longitudinally lifted from the first surface 61 of the first portion 58. Another check valve 34 is relatively longitudinally deposited to engage the first surface 61 of the first portion 58. The upper housing 36 is positioned into the cylinder head and threadably engaged with the first portion 58 of the lower housing 32. The spark plug 14 is then deposited into threadable engagement with the second portion 50 of the lower housing 32.

Prechamber assemblies having the check valve 34 of the present invention allows engineers to easily miniaturize the prechamber assembly 16. Prior check valves are limited to the amount of scalability that may be achieved due to spark plug 14 operational envelope, manufacturing limits, sealing requirements, and the like. The check valve 34 as described previously provides a more compact design than previous techniques and also allows the prechamber assembly 16 to fit within the valve bores for easier servicing. The check valve 34 has increased scalability between engine sizes and is easier to computationally model using combustion simulation tools. The use of the ring member 74 with the check valve 34 reduces the wear and thus improves life of the check valve 34. The check valve 34 may be designed to provide a more dynamic response than past techniques while reducing the complexity of manufacturing.

Other aspects, objects and advantages of this invention can be obtained from a study of the drawings, the disclosure and the appended claims.

What is claimed is:

1. A check valve, comprising:
    a ring shaped carrier member having first and second opposed sides, an annular ring groove disposed in said carrier member and opening at said second side, and a plurality of first orifices disposed in said carrier member and opening into said annular ring groove, wherein the first side of said carrier member having a supply groove disposed therein and opening at said first side of the carrier member and said plurality of first orifices of the carrier member opening into said supply groove;
    a ring shaped stop member having first and second opposed sides and a plurality of first orifices disposed in said stop member and opening at said first side, and said first side at least partially engaging said second side of the carrier member; and
    a ring member movably disposed in the annular ring groove of said carrier member and movable between a first position at which said ring member being adapted to block fluid communication between the plurality of first orifices in the carrier and said stop member and a second position at which said ring member passes fluid between the plurality of first orifices in the carrier and said stop member.

2. A check valve, as set forth in claim 1, wherein the carrier member having a plurality of first depression portions having a bottom surface and being disposed therein, said plurality of first depression portions defining a predetermined distance between said second side of the carrier member to said bottom surface, and opening at said second side of the carrier member.

3. A check valve, as set forth in claim 2, wherein said predetermined distance being greater in magnitude than a predetermined depth of said annular ring groove.

4. A check valve, as set forth in claim 2, wherein said plurality of first depressions each being elongated.

5. A check valve, as set forth in claim 1, wherein said first side of said stop member having a plurality of first depressions.

6. A check valve, as set forth in claim 5, wherein said plurality of first depressions having a bottom surface of the stop member extending a predetermined distance from said first side of the stop member towards said second side of the stop member.

7. A check valve, as set forth in claim 6, wherein said predetermined distance being generally equal in magnitude to a predetermined depth of said annular ring groove.

8. A check valve, as set forth in claim 5, wherein said annular ring groove having a resilient member disposed therein.

9. A check valve, as set forth in claim 1, wherein each of a plurality of first depressions of said stop member having a resilient member disposed therein.

10. A check valve, as set forth in claim 1, wherein said carrier member is fixedly engaged to said stop member.

11. A check valve, comprising:

a carrier member having first and second opposed sides, an annular ring groove disposed in said carrier member and opening at said second side, and a plurality of first orifices disposed in said carrier member and opening into said annular ring groove;

a stop member having first and second opposed sides and a plurality of first orifices disposed in said stop member and opening at said first side, and said first side at least partially engaging said second side of the carrier member;

a ring member movably disposed in the annular ring groove of said carrier member and movable between a first position at which said ring member being adapted to block fluid communication between the plurality of first orifices in the carrier and said stop members and a second position at which said ring member passes fluid between the plurality of first orifices in the carrier and said stop members; and said carrier member having a plurality of second depression portions having a bottom surface and being disposed therein, said plurality of second depression portions defining a predetermined distance between said second side of the carrier member to said bottom surface, and opening at said second side of the carrier member.

12. A check valve, as set forth in claim 11, wherein said predetermined distance being generally equal in magnitude to a predetermined depth of said annular ring groove.

13. A check valve, as set forth in claim 11, wherein said plurality of second depression portions having a plurality of side portions and each being tapered.

14. A check valve, comprising:

a ring shaped carrier member having first and second opposed sides, an annular ring groove disposed in said carrier member and opening at said second side, and a plurality of first orifices disposed in said carrier member and opening into said annular ring groove;

a ring shaped stop member having first and second opposed sides and a plurality of first orifices disposed in said stop member and opening at said first side, and said first side at least partially engaging said second side of the carrier member, wherein said stop member having a fuel groove disposed therein and opening at said first side of the stop member, said fuel groove having a predetermined width; and a ring member movably disposed in the annular ring groove of said carrier member and movable between a first position at which said ring member being adapted to block fluid communication between the plurality of first orifices in the carrier and said stop member and a second position at which said ring member passes fluid between the plurality of first orifices in the carrier and said stop member.

15. A check valve, as set forth in claim 14, wherein the first side of said carrier member having a supply groove disposed therein and opening at said first side of the carrier member and said plurality of first orifices of the carrier member opening into said supply groove.

16. A check valve, as set forth in claim 14, wherein said ring member having a second predetermined width.

17. A check valve, as set forth in claim 16, wherein said predetermined width of said annular ring groove being less in magnitude than said second predetermined width of said ring member.

18. A check valve, comprising:

a carrier member having first and second opposed sides, an annular ring groove disposed in said carrier member and opening at said second side, and a plurality of first orifices disposed in said carrier member and opening into said annular ring groove;

a stop member having first and second opposed sides and a plurality of first orifices disposed in said stop member and opening at said first side, and said first side at least partially engaging said second side of the carrier member;

a ring member movably disposed in the annular ring groove of said carrier member and movable between a first position at which said ring member being adapted to block fluid communication between the plurality of first orifices in the carrier and said stop members and a second position at which said ring member passes fluid between the plurality of first orifices in the carrier and said stop members; and said ring member having at least one notch disposed therein.

19. A check valve, as set forth in claim 18, wherein said ring member being formed by a plurality of ring portions.

* * * * *